(12) United States Patent
Miller et al.

(10) Patent No.: US 8,653,226 B2
(45) Date of Patent: Feb. 18, 2014

(54) POLYESTERACETALS

(75) Inventors: Stephen A. Miller, Gainesville, FL (US); Ryan T. Martin, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 107 days.

(21) Appl. No.: 13/132,731

(22) PCT Filed: Dec. 2, 2009

(86) PCT No.: PCT/US2009/066417
§ 371 (c)(1),
(2), (4) Date: Jun. 3, 2011

(87) PCT Pub. No.: WO2010/065641
PCT Pub. Date: Jun. 10, 2010

(65) Prior Publication Data
US 2011/0237772 A1 Sep. 29, 2011

Related U.S. Application Data

(60) Provisional application No. 61/119,911, filed on Dec. 4, 2008.

(51) Int. Cl.
*C08G 63/08* (2006.01)

(52) U.S. Cl.
USPC ........... 528/354; 424/524; 525/398; 525/400; 525/403; 525/408

(58) Field of Classification Search
USPC ................. 428/524; 525/398, 400, 403, 408; 528/354
See application file for complete search history.

(56) References Cited

U.S. PATENT DOCUMENTS

| | | | |
|---|---|---|---|
| 3,673,156 A | 6/1972 | Cevidalli et al. | |
| 5,424,136 A * | 6/1995 | Hermes | 428/524 |
| 2002/0094444 A1 * | 7/2002 | Nakata et al. | 428/480 |
| 2006/0235119 A1 * | 10/2006 | Schmalz et al. | 524/196 |
| 2007/0155926 A1 | 7/2007 | Matyjaszewski et al. | |
| 2008/0146773 A1 | 6/2008 | Chen | |

OTHER PUBLICATIONS

Clive, D.L. et al. "Preparation of Polycyclic Systems by Sequential 5-*Exo-Digonal* Radical Cyclization, 1,5-Hydrogen Transfer from Silicon, and 5-*Endo-Trigonal* Cyclization" *J. Org. Chem.*, 2001, 66(6):1966-1983.
Sano, T. etal. "Synthesis of 1,3-dioxolan-4-one from trioxane and carbon monoxide on HZSM-5 zeolite" *Chem. Commun.*, 1997, 1827-1828.
Serck-Hanssen, K., "Dioxolanones and Related Compounds" *Acta Chem. Scand.*, 1969, 23(8):2900-2902.
Wang, Z.B. et al. "Carbonylation of Formaldehyde with Carbon Monoxide over Cation-Exchange Resin Catalysts" *Bull. Chem. Soc. Jpn.*, 1999, 72(8):1935-1940.

* cited by examiner

*Primary Examiner* — Gregory Listvoyb
(74) *Attorney, Agent, or Firm* — Saliwanchik, Lloyd & Eisenschenk

(57) ABSTRACT

A polyesteracetal contains —[C(O)(CR$^3$R$^4$)$_x$(C(O))$_y$OCR$^1$R$^2$O]— repeating unit where x is 0 to 5, y is 0 or 1, and R$^1$, R$^2$, R$^3$ and R$^4$ are independently H, C$_1$ to C$_{24}$ alkyl, C$_2$ to C$_{24}$ alkenyl, C$_6$ to C$_{14}$ aryl, C$_7$ to C$_{24}$ alkylaryl, heteroatom interrupted C$_1$ to C$_{24}$ alkyl, heteroatom interrupted C$_2$ to C$_{24}$ alkenyl, heteroatom interrupted C$_4$ to C$_{14}$ aryl, or heteroatom interrupted C$_5$ to C$_{24}$ alkylaryl, and wherein on average x>1 or y>0. The polyesteracetal can be a homopolymer or copolymer. A method of preparing the polyesteracetal comprises a ring-opening polymerization of a cyclic esteracetal monomer using a metal alkolate, metal alkoxide or metal alkyl initiator.

16 Claims, 1 Drawing Sheet

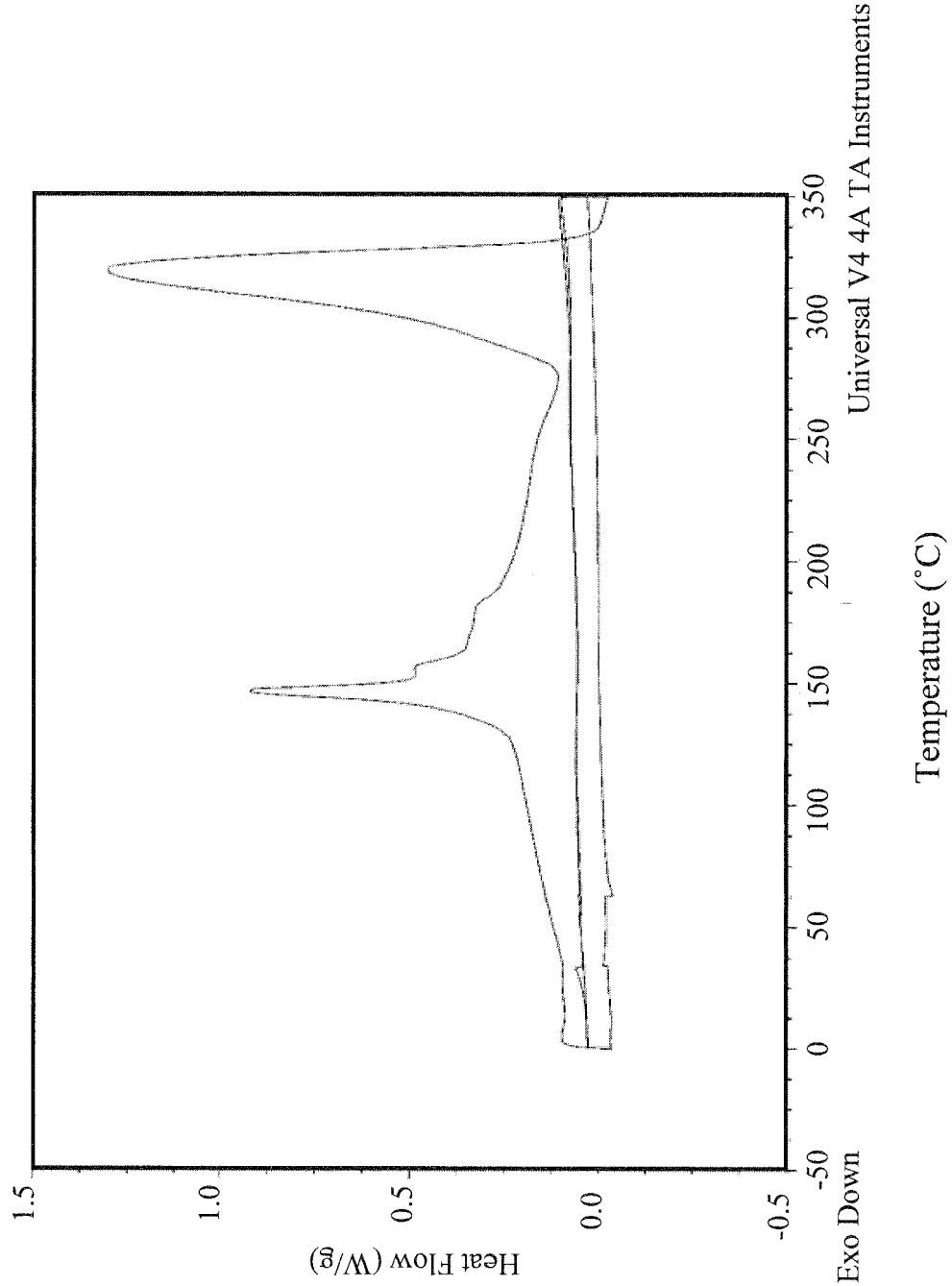

POLYESTERACETALS

CROSS-REFERENCE TO RELATED APPLICATIONS

This application is the U.S. national stage application of International Patent Application No. PCT/US2009/066417, filed Dec. 2, 2009, which claims the benefit of U.S. Provisional Application Ser. No. 61/119,911, filed Dec. 4, 2008, the disclosures of which are hereby incorporated by reference in their entireties, including all figures, tables or drawings.

BACKGROUND OF THE INVENTION

There has recently been an effort to transform the thermoplastic industry from one that produces plastics that persist in the environment and are made from non-renewable sources, such as oil derived chemicals, to functionally equivalent thermoplastics that can be prepared from renewable resources, such as plant based chemicals, that are biodegradable, having a sufficient yet finite lifetime in the environment. Only two synthetic polymers from renewable feedstocks have exhibited the potential to enter the commodity plastics market: polylactic acid (PLA) and poly-β-hydroxyalkanoate (PHA). Unfortunately, both polymers rely on biotransformations that tend to be expensive even for large scale production. The organic feedstock for PLA is starch or small sugars, which puts the thermoplastic precursor in economic competition with a food source. PHA requires bioengineered plants in a complex process that has yet to demonstrate economic viability.

An attractive alternative is the most abundant organic feedstock cellulose, which is not a human food. Cellulose acetate has been employed commercially as a polymer for more than a century, but requires levels of plasticizers in excess of 30% to be used as an extrudable thermoplastic and as the degree of acetylation decreases, the greater the level of plasticizer that is required. Furthermore, when the degree of acetylation is greater than 2.5, which is common, the cellulose acetate is not biodegradable.

Another way of employing cellulose to provide non-petroleum based polymers is to anaerobically distill it into methanol and develop polymerizable chemicals from methanol. Methanol is the central chemical of one of the few proposed future non-petroleum economies. Presently there are no monomers for biodegradable thermoplastics that are produced from chemicals easily formed from methanol. Hence novel biodegradable thermoplastics that can be derived ultimately from cellulose via a large scale intermediate such as methanol are desirable.

BRIEF SUMMARY OF THE INVENTION

Embodiments of the invention are directed to polyesteracetals including repeating units of the structure:

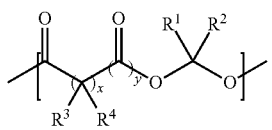

wherein: x is 0 to 5; y is 0 to 1; $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl. The polyesteracetals can be homopolymers or copolymers. The copolymers can be of two or more esteracetal repeating units or can be of one or more esteracetal repeating units with other repeating units, such as ester repeating units. The polyesteracetals can be biodegradable, for example, degradable by composting. The polyesteracetals can be thermoplastics.

Other embodiments of the invention are directed to the preparation of the polyesteracetals by the ring-opening polymerization of one or more cyclic esteracetal monomers of the structure:

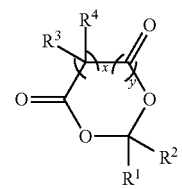

where x is 0 to 5, y is 0 to 1, $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl. An initiator is introduced to the cyclic monomer mixture to initiate polymerization. The polymerization can be carried out neat or in the presence of a solvent and can be carried out over a wide range of temperatures, for example from room temperature to 250° C. The polymerization can be initiated by a metal alkolate, metal alkoxide, or metal alkyl. Copolymerization can be carried out with additional non-esteracetal monomers such as caprolactone or cyclic lactides dimer.

BRIEF DESCRIPTION OF THE DRAWINGS

FIG. 1 is a differential scanning calorimetry (DSC) trace for a polyesteracetal homopolymer, poly(1,3-dioxolan-4-one), according to an embodiment of the invention.

DETAILED DESCRIPTION OF THE INVENTION

Embodiments of the invention are directed to polymers with esteracetal repeating units, or polyesteracetals. The repeating units have an O—CR$^1$R$^2$—O functionality where at least one of the sp$^3$ oxygens belongs to an ester group. The polyesteracetals are generally thermoplastics and are generally biodegradable under composting or other conditions. As such, the novel polyesteracetals permit the preparation of biodegradable thermoplastics that can be prepared from methanol derivatives, hence, ultimately from cellulose. In this manner in some embodiments, a biodegradable thermoplastic is prepared from a biologically derived raw material. The repeating unit can be present in a copolymer, where the copolymer can be a random copolymer of different esteracetal repeating units or copolymers of esteracetal repeating units with other repeating units, such as ester repeating units. The copolymers can be random copolymers or block copolymers depending upon the monomers used and the manner in which the copolymers are formed.

In one embodiment of the invention the polyesteracetal repeating units have the structure:

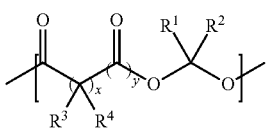

where x is 0 to 5; y is 0 to 1; $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl. It is to be understood that where there is a plurality of $R^3$ groups and a plurality of $R^4$ groups in an esteracetal repeating unit, every $R^3$ and every $R^4$ are independently chosen as defined, and each can be a different group. For example, where an esteracetal repeating unit has x=2, or $—(CR^3 R^4)_2—$, both $R^3$ groups can be the same group and the two $R^4$ can be different groups, for example $—(CH_2CH(CH_3))—$. Where y is 0, the polyesteracetal has a repeating unit that is a monoesteracetal and where y is 1 the repeating unit is a bisesteracetal. For additional clarity, the monoesteracetal repeating unit has the structure:

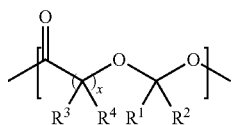

where x, $R^1$, $R^2$, $R^3$ and $R^4$ are defined as above. In some embodiments of the invention the value of x is 1 or 2. For additional clarity, the bisesteracetal repeating unit has the structure:

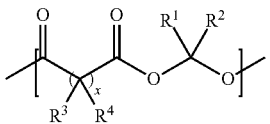

where x, $R^1$, $R^2$, $R^3$ and $R^4$ are defined as above. In some embodiments of the invention the value of x is 0, 1 or 2.

Depending upon the polymerization process used, the degree of polymerization can vary. In embodiments of the invention, homopolymers of a single esteracetal repeating units or copolymers with a plurality of different esteracetal repeating units, as defined above, have degree of polymerization that is in excess of about 30, for example 50, 100, 500, 1,000, 5,000, 10,000, 20,000, 50,000, 100,000, or more. As is appreciated by one skilled in the art, a sufficient degree of polymerization is one where desired material properties are achieved, allowing the polyesteracetal to be used in place of common petroleum based thermoplastics for specific applications yet allowing processing techniques, such as extrusion, injection molding, blow molding or fiber spinning, as needed for fabrication of a physical structure constructed from the polyesteracetal. other embodiments of the invention, the degree of polymerization is less than 30, for example 2, 3, 4, 5, 6, 7, 8, 9, 10, 15, 20, 25, or 29. These oligomeric and small polymeric esteracetals can be used in a variety of uses, for example, as additives and plasticizers.

The size of a sequence of esteracetal repeating units can be as little as one for copolymers with non-esteracetal repeating units that will randomly polymerize with the precursor monomers that yield the esteracetal repeating units. The esteracetal repeating units can be in random copolymers or block copolymers and can be in polymers of any architecture including branched, comb, star, and dendritic polymers and copolymers. The molecular weight distribution of the polymer can range from narrow to normal to broad, depending upon the specific monomer and conditions employed for their preparation.

In other embodiments of the invention, the novel polymers and copolymers containing esteracetal repeating units can be prepared by ring-opening polymerization of cyclic esteracetal monomers or oligomers. The cyclic esteracetal monomers are of the structure:

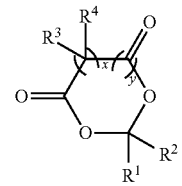

where x is 0 to 5; y is 0 to 1; $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl. Again, all $R^3$ can be the same or different and all $R^4$s can be the same or different. The cyclic esteracetal monomer can be a monoesteracetal where y is 0 or a bisesteracetal where y is 0. For additional clarity, the monoesteracetal cyclic esteracetal monomer has the structure:

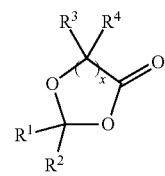

where x, $R^1$, $R^2$, $R^3$ and $R^4$ are defined as above. In some embodiments of the invention the value of x is 1 or 2. For additional clarity, the bisesteracetal cyclic esteracetal monomer has the structure:

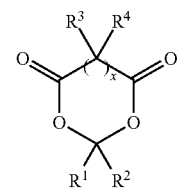

where x, $R^1$, $R^2$, $R^3$ and $R^4$ are defined as above. In some embodiments of the invention the value of x is 0, 1 or 2.

Cyclic esteracetal monomers can be prepared by any synthesis method known in the art of organic chemistry. For example, the monoesteracetal cyclic esteracetal monomers can be prepared by the methods described in Clive et al. *J. Org. Chem.* 2001, 66, 1966-83 and references cited therein using glycolic acid and paraformaldehyde, Sano et al. *Chem.*

*Commun.* 1997, 19, 1827-8 using trioxane and carbon monoxide over zeolite catalysts or Wang et al. *Bull. Chem. Soc. Japan* 1999, 8, 1935-40 using formaldehyde and carbon monoxide over a cationic exchange resin to form the cyclic esteracetal monomer 1,3-dioxolan-4-one, all incorporated herein by reference. Bisesteracetal cyclic esteracetal monomers can be prepared by the methods described in Serck-Hanssen *Acta Chem. Scand.* 1969, 23, 2900-34 using oxalic acid and formaldehyde to form the cyclic esteracetal monomer 1,3-dioxolan-4,5-dione, incorporated by reference herein. Modification of these methods and other methods for preparing other cyclic esteracetal monomers according to embodiments of the invention are apparent to those skilled in the art.

The polymerizations commence upon the inclusion of an initiator. The proportion of the cyclic esteracetal monomers to initiator can determine the size of the polymer. In one embodiment of the invention, where a homopolymerization of a cyclic esteracetal monomer can proceed to complete consumption of the monomer, the degree of polymerization depends on the ratio of monomer molecules to initiator molecules and the number of chains initiated by the initiator. For example, in many embodiments of the invention, the degree of polymerization is equal to [monomer]/[initiator] where a single chain is initiated by a single initiator. In other embodiments of the invention employing an initiator, the degree of polymerization is not equal to [monomer]/[initiator] due to incomplete initiation, chain transfer process, chain coupling, or other processes that can occur during or be applied to a polymerization mixture. Where cyclic monomer and/or cyclic oligomers are formed when an equilibrium mixture is established during polymerization, knowledge of the equilibrium constants for cyclic esteracetal monomers and oligomers allows the design of the polymer size for any given proportion of monomer, solvent and initiator employed using relationships known to those skilled in the art. In some embodiments of the invention, the initiator can be a metal alkolate or metal alkoxide, such as stannous octoate and aluminum isopropoxide, separately or in conjunction with an alcohol, such as 1-butanol or benzyl alcohol. In some embodiments of the invention, cyclic esteracetal monomers can be polymerized where the initiator is a metal alkyl, for example a Grignard reagent. Other metal alkolates, metal alkoxides or metal alkyls, with or without a metal complexing agent, that can be employed as initiators include: dimeric aluminum chloride complexes of N-alkoxyalkyl-β-ketoimines (which can be activated by propylene oxide); alkoxy-amino-bis-(phenolate); Group 3 metal complexes; aluminum complexes bearing tetradentate bis(aminophenoxide) ligands; hetero-bimetallic iron(II) alkoxide/aryloxides; stannous octoate and diethanolamine; stannous octoate and triphenylamine; stannous octoate and compounds of titanium and zirconium; stannous trifluoromethane sulphonate; scandium(III) trifluoromethane sulfonate; Sn substituted mesoporous silica molecular sieves; yttrium tris(2,6-di-tert butylphenolate); butyl lithium; butyl magnesium; β-diiminate ligated magnesium and zinc amides; zinc alkoxide complex; titanium alkoxide; iron alkoxide, 2,6-dimethyl aryloxide; calcium coordination complexes; complexes of Cu, Zn, Co and Ni Schiff base derived from salicylidene and L-aspartic acid; potassium naphthalenide; complexes of iron with acetic, butyric, isobutyric and dichloroacetic acids; zinc lactate, dizinc-monoalkoxide complex supported by a dinucleating ligand; sodium or other alkali metal-based alkoxide and/or phenoxide complexes, with or without an alcohol; stannous octoate with adducts containing oligomeric lactides; tertiary amines and/or phosphines and N-heterocyclic carbenes; alkyl aluminum; and aluminum-ligand complexes.

Polymerization of the cyclic esteracetal monomers can be carried out with or without solvent in the polymerization mixture. Depending upon the nature of $R^1$, $R^2$, $R^3$ and $R^4$, different solvents are possible. Some solvents, such as alcohols can result in chain transfer reactions and their inclusion should be as designed, particularly if a chain transfer step is desired to attenuate the molecular weight of the polyesteracetal produce. Nonprotic polar solvents and nonpolar solvents can be used in the reactions. Particularly where sufficient strain or other features that energetically bias the reaction to the cyclic esteracetal monomer over unstrained or otherwise inhibited esteracetal repeating units of the growing polymer chain, the initiator and/or solvent can be chosen to lower the dispersivity of the molecular weights in the polymer mixture that is formed. Again, those skilled in the art can appreciate that the type of mixture will promote a desired dispersity when possible.

Polymerization can be carried out to promote the formation of random or block copolymers. Copolymerization can be that of two or more cyclic esteracetal monomers or polymerization of one or more cyclic esteracetal monomers with other monomers, for example with other cyclic monomers such as caprolactone or cyclic lactide dimer. Reactivity ratios for pairs or mixtures of multiple monomers can be determined by well known experimental methods and used to determine the mixtures and/or mode of addition to use for the formation of polymers where random or blocky structure are desired. Where $R^1$ differs from $R^2$ and/or $R^3$ differs from $R^4$, stereoregular homopolymers can be formed using initiators that do not promote racemization of the substituted carbons, for example where $R^3=H \neq R^4$ adjacent to a carbonyl using an insufficiently strong basic initiator, such that a stereoregular homopolymer can be formed. In some embodiments of the invention, initiators that promote the growth of two or more polyesteracetal chains can be employed, including monomeric, oligomeric or polymeric initiators that contain a plurality of end-groups that act as initiators for the cyclic esteracetal monomers and form covalent bonds between a common initiator fragment and the growing polyesteracetal chains.

In other embodiments of the invention an included terminating or chain transfer agent can be employed to control the molecular weight. The agents can be used to form end functionalized polyesteracetals, including telechelic polyesteracetal. In embodiments where the terminating agent is a polymer, a block copolymer can be formed. In other embodiments of the invention, the polyesteracetal having at least one active center residue formed from the monomers and the initiator can promote the polymerization of an additional non-esteracetal monomer that forms a non-esteracetal block of a block copolymer. Other polymer architectures containing esteracetal repeating units and processes to prepare these architectures can be readily envisioned by those skilled in the art and are within the scope of embodiments of the invention.

Polymerization concentrations, temperatures and times can be adjusted as needed to promote the formation of polyesteracetals. Where the cyclic esteracetal monomers are unstrained, polymerization is generally promoted at high concentrations and is often optimized in a solvent free system if possible. Where the cyclic esteracetal monomers are strained, polymerization is generally promoted at lower temperatures, particularly below a ceiling temperature, for example about 110° C. for the polymerization of 1,3-dioxolan-4-one. Polymerization times can vary significantly based on the monomers, initiators, solvents and temperatures employed. In general, systems are designed for polymerization that allow as short a period of time as possible, given that any deleterious side process, for example a dangerous exotherm, can be avoided. Generally, reaction times will range from about a minute to less than a day, although longer times can be used as needed. In general reaction temperature between normal room temperatures and 100° C. are sufficient to achieve appropriate reaction times.

Following polymerization, the polyesteracetal can be isolated in a sufficiently pure form for use as a structural material. Although in some embodiments the polymers can be used as formed, in other embodiments isolation needs to be carried out by any known methods including extraction, precipitation, devolatilization, and freeze drying. Appropriate methods and conditions depend on the desired polymer structure and the monomers and solvents used and are apparent to those skilled in the art.

MATERIALS AND METHODS

Preparation of a
Polyesteracetal—Poly(1,3-dioxolan-4-one)

EXAMPLE 1

Purified 1,3-dioxolan-4-one (4.148 g, 46 mmol) was placed in a flask and dissolved in anhydrous toluene (46 mL) under nitrogen at 70° C. A solution of tin(II)2-ethylhexanoate (571 mg, 1.4 mmol) and benzyl alcohol (151 mg, 1.4 mmol) in anhydrous toluene (3.92 mL) was added into the flask through a septum. A white precipitate was formed within 1 hr and the reaction mixture was allowed to stir under nitrogen for an additional 23 hr. After removal of toluene under vacuum, the product was washed with 200 mL of cold methanol, and dried under vacuum at room temperature for 72 hr.

FIG. 1 is a DSC trace of the poly(1,3-dioxolan-4-one) product. An endotherm at about 145° C. is consistent with a melting transition and a second endotherm at about 320° C. is consistent with polymer decomposition.

EXAMPLE 2

Purified 1,3-dioxolan-4-one (4.048 g, 46 mmol) was placed in a flask and dissolved in anhydrous toluene (46 mL) under nitrogen at 70° C. A solution of tin(II)2-ethylhexanoate (571 mg, 1.4 mmol) and benzyl alcohol (151 mg, 1.4 mmol) in anhydrous toluene (3.92 mL) was added into the flask through a septum. A white precipitate was formed within 1 hr and the reaction mixture was allowed to stir under nitrogen for an additional 23 hr. After removal of toluene under vacuum, the product was washed with 200 mL of cold methanol, and dried under vacuum at room temperature for 24 hr.

EXAMPLE 3

Purified 1,3-dioxolan-4-one (2.024 g, 23 mmol) was placed in a flask and dissolved in anhydrous toluene (20 mL) under nitrogen at 25° C. BHT$_2$MgTHF (61.54 mg, 0.12 mmol, BHT=butylated hydroxy toluene) and benzyl alcohol (12 μL mg, 0.12 mmol) was added to the flask under an inert atmosphere. A gel-like product was formed immediately and the reaction mixture was allowed to stir under nitrogen for an additional 24 hr. After removal of toluene under vacuum, the product was washed with 200 mL of cold methanol, and dried under vacuum at room temperature for 24 hr.

EXAMPLE 4

Purified 1,3-dioxolan-4-one (2.024 g, 23 mmol) and purified L-lactide (3.319 g, 23 mmol) were placed in a flask and dissolved in anhydrous toluene (46 mL) under nitrogen at 70° C. A solution of tin(II)2-ethylhexanoate (571 mg, 1.4 mmol) and benzyl alcohol (151 mg, 1.4 mmol) in anhydrous toluene (3.92 mL) was added into the flask through a septum. A white precipitate was formed within 1 hr and the reaction mixture was allowed to stir under nitrogen for an additional 23 hr. After removal of toluene under vacuum, the copolymer product was washed with 200 mL of cold methanol, and dried under vacuum at room temperature for 24 hr.

All publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A polyesteracetal, comprising repeating units of the structure:

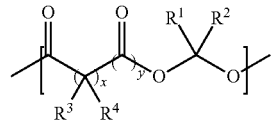

wherein: x is 0 to 5; y is 0 to 1; $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl; wherein said polyesteracetal is a copolymer comprising a plurality of repeating unit structures, and wherein for said plurality of repeating unit structures, on average, x>1 and y>0.

2. The polyesteracetal of claim 1, wherein for at least one of said plurality of repeating unit structures said x is 1 or 2 and y is 0, and wherein for said plurality of repeating unit structures, on average, x>1 and y>0.

3. The polyesteracetal of claim 2, wherein for at least one of said plurality of repeating unit structures said x is 2, y is 0 and $R^1$, $R^2$, $R^3$ and $R^4$ are H, and wherein for said plurality of repeating unit structures, on average, x>1 and y>0.

4. A polyesteracetal, comprising repeating units of the structure:

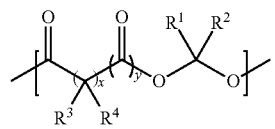

wherein: x is 0 to 2; y is 1; $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl; wherein said x is 0, 1 or 2, and y is 1.

5. The polyesteracetal of claim 4, wherein said x is 0, 1 or 2, y is 1 and $R^1$, $R^2$, $R^3$ and $R^4$ are H.

6. The polyesteracetal of claim 5, wherein said x is 0, y is 1 and $R^1$ and $R^2$ are H.

7. The polyesteracetal of claim 1, wherein said polyesteracetal is biodegradable.

8. The polyesteracetal of claim 1, wherein said polyesteracetal is a thermoplastic.

9. The polyesteracetal of claim 1, wherein said copolymer further comprises non-esteracetal repeating units.

10. The polyesteracetal of claim 9, wherein said non-esteracetal repeating units comprise caprolactone or lactide repeating units.

11. A method of preparing a polyesteracetal comprising the steps of:

providing a polymerization mixture comprising a plurality of at least two cyclic esteracetal monomers of the structure:

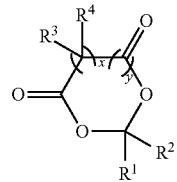

wherein x is 0 to 5, y is 0 to 1, $R^1$, $R^2$, $R^3$ and $R^4$ are independently H, $C_1$ to $C_{24}$ alkyl, $C_2$ to $C_{24}$ alkenyl, $C_6$ to $C_{14}$ aryl, $C_7$ to $C_{24}$ alkylaryl, heteroatom interrupted $C_1$ to $C_{24}$ alkyl, heteroatom interrupted $C_2$ to $C_{24}$ alkenyl, heteroatom interrupted $C_4$ to $C_{14}$ aryl, or heteroatom interrupted $C_5$ to $C_{24}$ alkylaryl, and wherein for said plurality of at least two cyclic esteracetal monomers, on average, x>1 and y>0; and polymerizing said cyclic monomers upon addition of an initiator to said polymerization mixture.

12. The method of claim 11, wherein said polymerization mixture further comprises a solvent.

13. The method of claim 11, wherein said initiator comprises a metal alkolate, metal alkoxide, or metal alkyl.

14. The method of claim 13, wherein said metal alkolate comprises tin (II) alkolate, or an aluminum alkoxide.

15. The method of claim 11, wherein said polymerization mixture further comprises a non-esteracetal monomer.

16. The method of claim 15, wherein said non-esteracetal monomer comprises caprolactone or cyclic lactide dimer.

* * * * *